Patented Apr. 10, 1934

1,953,972

UNITED STATES PATENT OFFICE 1,953,972

MANUFACTURE OF RUBBER ARTICLES

Edward Arthur Murphy and Alfred Niven, Erdington, Birmingham, and Douglas Frank Twiss, Wylde Green, England, assignors to Dunlop Rubber Company, Limited, a British corporation No Drawing. Application February 5, 1931, Serial No. 513,769. In Great Britain March 10, 1930

20 Claims. (Cl. 106—23)

This invention relates to improvements in or relating to the manufacture of goods of rubber or similar material and more particularly to the production of homogeneous compositions of rubber or rubber material and combining ingredients from aqueous dispersions of rubber material.

This invention comprises improvements in or relating to the manufacture of goods of rubber or similar material and is particularly concerned with the production of granular aqueous dispersions of rubber or similar material from aqueous dispersions thereof of the kinds hereinafter specified for application in the production of articles of or containing rubber provided with a smooth matt to a coarse granular texture as desired.

Objects of the invention are to produce a mass of coagulated rubber or rubber material from a dispersion in such form that it may be readily washed free from any soluble salts or soluble constituents; to provide a method of forming a washable precipitate of rubber-like material having finely divided substances such as reinforcing agents, or compounding ingredients uniformly disseminated throughout the rubber composition; and to produce such coagulated or crumb-like masses of rubber and compounding ingredients by the inter-action or double decomposition of concentrated aqueous solutions, and wherein concentrated aqueous solutions of reagents may be employed without the concomitant addition of a relatively large volume of water and in which the concentration of the finely divided substances in the coagulated or crumb-like masses of rubber composition may be relatively high, and in which the resulting crumb-like consistency of the rubber compositions enables any water soluble product of the double decomposition to be removed.

Further objects of the invention are to provide a method of forming rubber compositions of the above type in which the degree of fineness of the precipitated reinforcing ingredient or ingredients is substantially preserved; and to provide a reinforced rubber composition of crumb-like structure.

A further object of the invention is to produce articles of or containing rubber or similar material with a surface finish ranging from a smooth matt to a coarse granular texture as desired.

In our present invention the rubber compositions are obtained by effecting the coagulation of an aqueous dispersion of a rubber material by precipitating in situ one or more compounding ingredients by the inter-action or double decomposition of one or more water soluble reagents, which normally have no coagulating effect upon the dispersion, with one or more water soluble reagents having an ion which may possess coagulating properties and by adding the second reagent to the dispersion containing the first reagent whereby the precipitate of reinforcing or compounding constituent is obtained and the dispersions are transformed into a crumb-like condition.

The formation of the coagulated or crumb-like masses may be due either to the presence of the second reagent or to the development of the precipitate of the soluble product. The aqueous dispersion is preferably stirred or agitated while the compounding is being carried out. The crumb-like mass resulting from the double decomposition is not gelatinous, but is freely permeable by water, thus enabling the soluble reaction products to be readily washed from the rubber composition. Alternatively or additionally, the compounding homogeneous compositions of rubber material can be obtained in a washable, crumb-like or granular form by agitating the compounded compositions produced subsequent to their formation, for these intermediary compositions are of low mechanical strength and are easily broken up.

By suitably controlling the concentrations and other conditions during precipitation, granular precipitates of different degrees of fineness or coarseness may be obtained, and these precipitates may then be used to form a surface coating of desired characteristics which may range from a smooth matte of coarse crepe-like effects. For this purpose the article to be provided with the surface finish is coated with a granular precipitate of proper size and characteristics and then subsequently dried.

The surface coatings can be applied by any one or more of the known operations of spreading, spraying, dipping or pouring.

Examples of the water-soluble reagents of the first class having normally no coagulating effect upon the dispersions are carbonates, sulphates or silicates of the alkali metals or of ammonium.

Examples of the water-soluble reagents of the second class which interact with the water-soluble reagents of the first class to produce insoluble compounding ingredients are soluble salts of magnesium, aluminium, calcium, barium or zinc; sodium silicate also falls into this class if the corresponding reagent in the first class is such as to precipitate silicic acid, for example, ammonium carbonate.

The sulphides of the alkali metals and of ammonium also belong to the water soluble reagents of the first class and can react with such water soluble reagents of the second class as the soluble salts of zinc, cadmium and lead.

By a suitable choice of the reaction products a loose crumb-like mass can be formed which contains the precipitate in a finely divided condition dispersed in the particles of compounded crumb-like coagulum. The nature of the crumb is such that it may be readily washed free from soluble reaction products, such as soluble sulphate or chloride by decantation, filtration or on a washing mill or machine of the types already employed. In most cases the precipitated compounding ingredient or ingredients obtained under these conditions can be washed much more easily than when it is prepared from solutions of similar concentration but in the absence of the aqueous dispersions hereinbefore specified owing to the gelatinous nature of the precipitates in the latter case.

The crumb may be dried and milled in the usual manner, the crumb structure being found to aid the drying operation.

By a suitable choice of the reagents and consequent reaction products dispersions of varying consistency can be formed which contain the precipitate in a finely divided condition inside the particles of the compounded coagulum of which the granular dispersion is constituted, thereby permitting a surface finish to be obtained ranging from a smooth matt to a coarse granular texture as desired.

If desired the granular dispersions are washed free from soluble reaction products such as soluble sulphates or chlorides by known means such as decantation or filtration prior to their application as a coating material.

Numerous substances are capable of being used as compounding ingredients, for example, the carbonates of magnesium, calcium and zinc may be prepared from sodium carbonate and the sulphates or chlorides of these metals. Similarly the silicates of magnesium, barium and zinc can be prepared from sodium silicate and the corresponding sulphates or chlorides.

Further mixtures of precipitates may be prepared and may be chosen in such a manner that only one soluble reaction product results for two insoluble products, for example, the reaction between one equivalent of sodium carbonate with one of magnesium sulphate followed by one equivalent of barium chloride yields only one equivalent of sodium chloride for two equivalents of mixed precipitate. In this manner a large yield of precipitate may be obtained for a small proportion of soluble salt to be removed.

The reagents may be added in the form of their aqueous solutions and may contain protective colloids such as glue, gum acacia, in solution, to increase the fineness of sub-division of the precipitated compounding ingredients.

The concentration of the reacting solutions may also be selected for the same purpose.

The rate at which coagulation takes place after the introduction of the water-soluble reagent of the second class may be controlled by the addition of suitable substances, e. g. soaps such as ammonium oleate or stearate.

The dispersions comprise by way of example, those consisting of or containing rubber, guttapercha, balata or similar vegetable resins, occurring naturally, or artificially obtained and in vulcanized or unvulcanized condition Aqueous dispersions of artificial rubber, coagulated rubber, vulcanized rubber, waste or reclaim, may also be employed if desired as alternatives or admixtures.

All of the above materials whether of artificial or natural origin are hereinafter designated as rubber material.

Any of the aforesaid dispersions may contain the usual known compounding ingredients and/or may be in concentrated form.

Concentrates such as are obtained in co-pending Patent 1,846,164 Feb. 23, 1932, in which may be incorporated any one or more of the usual compounding ingredients, may also be used.

The following is given by way of example as to how to produce the aforesaid granular dispersions:—

A latex mixing having the following composition—

|  | Parts by weight |
|---|---|
| Rubber—used in the form of latex of 60% concentration | 56 |
| Sulphur | 2 |
| Zinc diethyldithiocarbamate | 0.5 |
| Zinc oxide | 3 |
| Colloidal magnesium silicate | 37.5 |
| Oleic acid | 1.0 | is prepared in the following manner:—

2 parts of sulphur are dispersed in 5 parts of water containing one part of oleic acid in solution as ammonium oleate. This dispersion is added to the required amount of latex, together with a dispersion consisting of 3 parts zinc oxide, 0.5 part accelerator in 10 parts of water containing 0.3 part of glue and 0.3 part of casein in solution.

The mixture is stirred in a suitable mixing machine, then 50 parts of sodium silicate are added in the form of a 7% solution. The stirring is continued for a few minutes, then while the stirring is still in progress 45 parts of magnesium sulphate are introduced in the form of a 7% solution containing 0.5 part of glue in solution. After two or three minutes' agitation the mass is changed into a granular dispersion. This is passed through a coarse sieve (e. g. 16-mesh) to remove large particles and is then ready for use.

Microscopic examination of the milled rubber shows the magnesium silicate to be present in the form of particles 0.2 to 0.5 of a micron in size.

The material when passed between warm mixing mills consolidates into a coherent sheet and may be molded, extruded or calendered in the usual manner.

The homogeneous rubber compositions obtained according to this invention are suitable for the manufacture of a large variety of articles such as boot soles, sheet flooring, and treads for tires.

The granular dispersions are suitable in the manufacture of a large variety of articles such as soles of beach or tennis shoes, galoshes and handle grips. For example, a granular dispersion giving a smooth matt surface, may be used as a final spread coating for proofed fabrics in order to impart a permanent, smooth, non-glossy finish similar to that usually produced by treatment with starch powder. The roughened, non-slip surface required on surgeons gloves may be imparted to the gloves by dipping them before vulcanization into the granular dispersions and thereafter allowing the deposits to dry.

The granular dispersions can also be employed to give the coarser granular surfaces required in the production of imitation crepe or rough nonslip soles of beach or tennis shoes or of goloshes or for handle grips or for surfaces which are required to be rough and uneven for the purposes of use or ornamentation.

Having now particularly described and ascertained the nature of our said invention, and in what manner the same is to be performed, we declare that what we claim is:—

1. A process for the manufacture of compounded homogeneous compositions of rubber in a washable crumb-like granular form from aqueous dispersions thereof which comprises adding to said dispersion a water soluble reagent having normally no coagulative effect upon the dispersion, and then adding a reagent to form a water insoluble inert inorganic compounding ingredient by interaction with said first reagent and having ions which possess coagulating influences upon the aforesaid dispersion sufficient to coagulate said dispersion whereby the coagulate is obtained in crumb-like form that is easily washable.

2. A process as claimed in claim 1 wherein the coagulation of the aqueous dispersions aforesaid is effected during stirring or agitation thereof.

3. A process as claimed in claim 1 wherein the soluble reagents are added as concentrated aqueous solutions thereof.

4. A process as claimed in claim 1 wherein the water soluble reagents first added having normally no coagulating effect upon the aforesaid dispersion are salts of the alkali metal group and of an acid forming a precipitate with the metal of the salt of the second class.

5. A process as claimed in claim 1 wherein the water soluble reagents added to the first reagents to produce insoluble compounding ingredients are soluble salts of the class consisting of carbonates, sulphates and silicates and sulphides.

6. The process as claimed in claim 1 wherein sodium silicate is added to the aqueous dispersion aforesaid containing a reagent that precipitates silicic acid by reaction with said sodium silicate.

7. The process as claimed in claim 1 wherein the soluble reaction products are washed from the crumb-like or granular precipitates produced.

8. The process as claimed in claim 1 wherein the crumb-like or granular precipitates are milled in the usual manner to consolidate the aforesaid crumb-like or granular precipitates into a coherent sheet.

9. A process as claimed in claim 1 wherein the compounding ingredient produced in situ is a carbonate of the group of metals consisting of magnesium, calcium and zinc.

10. A process as claimed in claim 1 wherein the compounding ingredient produced in situ is a sulphide of a metal of the group consisting of zinc, cadmium and lead.

11. A process as claimed in claim 1 wherein the reagents contain protective colloids.

12. The process as defined in claim 1 in which the granular precipitates are applied as a coating to a rubber surface.

13. A process of forming rubber composition from aqueous dispersions which comprises adding a water soluble reagent containing an inorganic rubber dispersion to a reagent that forms an inert inorganic precipitate with said added reagent, and coagulating said rubber dispersion simultaneously with the addition of said reagent whereby the coagulate is obtained in crumb-like form which is easily washable.

14. A process for the manufacture of compounded homogeneous compositions of rubber material in a washable crumb-like form from aqueous dispersions thereof which comprises adding to an aqueous dispersion of the rubber material and in a large amount relatively to the dry rubber content thereof, a water soluble reagent having normally no coagulating effect upon the dispersion, thereafter adding a water solution of a reagent to form an insoluble inert inorganic compounding ingredient by interaction with said first reagent, and simultaneously coagulating the dispersion whereby the coagulate is obtained in crumb-like form that is easily washable.

15. A method for the production of articles of rubber material with selected surface finish in a range from a smooth matte to a coarse granular texture which comprises forming precipitates of controlled size from an aqueous dispersion of rubber by adding a water soluble reagent to a rubber dispersion containing in solution a reagent that forms with said added reagent an inorganic inert precipitate, and simultaneously coagulating said rubber dispersion, then coating the article to be finished with said granular dispersion, and subsequently drying the coating thereon.

16. The process of claim 15 in which the size and characteristics of said precipitate are controlled in part by agitating said dispersion during said coagulation.

17. The process of claim 15 in which the size of said coagulated particles is controlled in part by the addition of stabilizing agents that retard precipitation.

18. A process for the manufacture of compounded homogeneous compositions of rubber in a washable crumb-like granular form from aqueous dispersions thereof, which comprises adding to said dispersion a water soluble reagent having normally no coagulative effect upon the dispersion, then adding a reagent to form a water insoluble inert inorganic compounding ingredient by interaction with said first reagent, and a soluble reaction product, then adding a third reagent which forms with said soluble reaction product a second water insoluble inorganic compounding ingredient and a product having ions, which possess coagulating influence upon the aforesaid dispersion sufficient to coagulate said dispersion whereby the coagulate is obtained in crumb-like form that is easily washable.

19. A process for the manufacture of compounded homogeneous compositions of rubber in a washable crumb-like granular form from aqueous dispersions thereof, which comprises adding thereto in equivalent proportions a solution of sodium carbonate, a solution of magnesium sulphate and a solution of barium chloride to form a mixed precipitate and forming a soluble salt having ions, which possess coagulating influence upon said dispersion sufficient to coagulate said dispersion whereby the coagulate is obtained in crumb-like form that is easily washable.

20. Compounded unmasticated rubber in washable crumb-like form and containing substantial quantities of inert inorganic compounding ingredients, said ingredients being in the form of particles in size from about 0.2 to about 0.5 of a micron and formed from dissolved reagents in and during the coagulation of an aqueous dispersion of rubber by adding to said dispersion first a water soluble reagent having normally no coagulating effect upon said dispersion, and then a reagent interacting with said first reagent to form the insoluble inorganic compounding ingredient by interaction with said first reagent.

EDWARD ARTHUR MURPHY.
ALFRED NIVEN.
DOUGLAS FRANK TWISS.

CERTIFICATE OF CORRECTION.

Patent No. 1,953,972.

April 10, 1934.

EDWARD ARTHUR MURPHY, ET AL.

It is hereby certified that error appears in the printed specification of the above numbered patent requiring correction as follows: Page 3, lines 80 and 81, claim 13, strike out the words "containing an inorganic rubber dispersion to a" and insert to a rubber dispersion containing an inorganic; and that the said Letters Patent should be read with this correction therein that the same may conform to the record of the case in the Patent Office.

Signed and sealed this 15th day of May, A. D. 1934.

Bryan M. Battey

Acting Commissioner of Patents.

(Seal)